United States Patent [19]

Buckley

[11] Patent Number: 5,312,965
[45] Date of Patent: May 17, 1994

[54] LUBRICATING OIL COMPOSITION CONTAINING SUBSTANTIALLY STRAIGHT CHAIN ALKYLPHENYL POLY(OXYPROPYLENE) AMINOCARBAMATES

[75] Inventor: Thomas F. Buckley, Hercules, Calif.

[73] Assignee: Chevron Research Company, San Francisco, Calif.

[21] Appl. No.: 803,657

[22] Filed: Nov. 27, 1991

Related U.S. Application Data

[63] Continuation of Ser. No. 69,674, Jul. 2, 1987, abandoned.

[51] Int. Cl.$^5$ ............................................. C10M 133/00
[52] U.S. Cl. ............................ 560/159; 252/51.005 R
[58] Field of Search ...................... 252/51.5 R; 560/159

[56] References Cited

U.S. PATENT DOCUMENTS

| | | | |
|---|---|---|---|
| 2,991,162 | 7/1961 | Malec | 44/58 |
| 4,160,648 | 7/1979 | Lewis et al. | 44/63 |
| 4,191,537 | 3/1980 | Lewis | 44/71 |
| 4,197,409 | 4/1980 | Lilburn | 252/51.5 A |
| 4,198,306 | 4/1980 | Lewis | 252/51.5 R |
| 4,233,168 | 11/1980 | Lewis | 252/51.5 R X |
| 4,236,020 | 11/1980 | Lewis | 560/159 |
| 4,243,798 | 1/1981 | Franklin et al. | 528/371 |
| 4,270,930 | 6/1981 | Campbell et al. | 44/71 |
| 4,274,837 | 6/1981 | Lilburn | 44/63 |
| 4,288,612 | 9/1981 | Lewis et al. | 560/159 |
| 4,289,634 | 9/1981 | Lewis | 252/32.5 |
| 4,294,714 | 10/1981 | Lewis | 252/34 |
| 4,329,240 | 5/1982 | Lilburn | 252/51.5 A |
| 4,332,595 | 6/1982 | Herbstman et al. | 44/72 |
| 4,438,022 | 3/1984 | Campbell | 252/51.5 R |
| 4,521,610 | 6/1985 | Plavac | 560/27 |
| 4,537,693 | 8/1985 | Campbell | 252/51.5 R |
| 4,568,358 | 2/1986 | Courtney | 44/57 |
| 4,604,103 | 8/1986 | Campbell | 44/72 |
| 4,695,291 | 9/1987 | Plavac | 44/62 |
| 4,728,451 | 3/1988 | Plavac | 252/51.5 A |

FOREIGN PATENT DOCUMENTS 0105713  4/1984  European Pat. Off. ....... 252/51.5 R

*Primary Examiner*—Jacqueline V. Howard
*Attorney, Agent, or Firm*—Claude J. Caroli

[57] ABSTRACT

Disclosed are alkylphenyl poly(oxypropylene) aminocarbamates having at least one basic nitrogen and an average molecular weight of about 600 to 6,000 and wherein the alkyl group is substantially straight-chain of at least 15 carbon atoms. Also disclosed are lubricating oil compositions and concentrates containing said alkylphenyl poly(oxypropylene) aminocarbamates.

8 Claims, No Drawings

LUBRICATING OIL COMPOSITION CONTAINING SUBSTANTIALLY STRAIGHT CHAIN ALKYLPHENYL POLY(OXYPROPYLENE) AMINOCARBAMATES

This application is a continuation of application Ser. No. 069,674, filed Jul. 2, 1987, now abandoned.

BACKGROUND OF THE INVENTION

1. Field of the Invention

This invention is directed toward dispersants compatible in lubricating oil. In particular, this invention is directed toward dispersant additives compatible in lubricating oil which are alkylphenyl poly(oxypropylene) aminocarbamates having at least one basic nitrogen and wherein the alkyl group is a substantially straight-chain alkyl group of at least 15 carbon atoms.

The incompatibility of certain dispersant additives in lubricating oil, i.e., oils which contain other additives, is recognized in the art and arises in spite of the fact that certain of these additives are known lubricating oil dispersants.

Several theories exist as to the cause of the lubricating oil incompatibility of certain additives. Without being limited to any theory, it is possible that some of these additives interfere with other additives contained in the lubricating oil and either counterbalance the effectiveness of these additives or actually cause dissolution of one or more of these additives, including possibly the dispersant additive itself. In either case, the incompatibility of the additive with other additives in the lubricating oil demonstrates itself in less than desirable crankcase deposits as measured by Sequence V-D engine tests.

In another theory, it is possible that the additive will decompose in the lubricating during engine operation and the decomposition products are what cause increased crankcase deposits.

It is also possible that the incompatibility of the additive is related to its oil solubility. Lubricating oil incompatible additives are less than desirable insofar as their use during engine operation will result in increased deposits in the crankcase. This problem can be severe. For example, hydrocarbyl poly(oxyalkylene) aminocarbamate, including the hydrocarbyl poly(oxybutylene) aminocarbamate, are known to possess dispersant properties in lubricating oil. In this regard, it is recognized that the hydrocarbyl poly(oxybutylene) aminocarbamates are substantially more expensive than the hydrocarbyl poly(oxypropylene) aminocarbamates. However, because heretofore no known hydrocarbyl poly(oxypropylene) aminocarbamate was found to be sufficiently lubricating oil compatible, it is necessary to employ the more expensive hydrocarbyl poly(oxybutylene) aminocarbamates which are sufficiently lubricating oil compatible. Accordingly, it would be particularly advantageous to develop a hydrocarbyl poly(oxypropylene) aminocarbamate which is compatible in lubricating oil compositions.

The instant invention is directed to a novel class of hydrocarbyl poly(oxypropylene) aminocarbamates which are compatible with the lubricating oil composition. The novel additives of this invention are alkylphenyl poly(oxypropylene) aminocarbamates having a molecular weight of about 600 to 6,000 wherein the alkyl group is substantially straight chain containing at least 15 carbon atoms.

2. Prior Art

Numerous references disclose hydrocarbyl poly(oxyalkylene) aminocarbamates as fuel additives. These include the following U.S. Pat. Nos.:
4,160,648;
4,191,537;
4,197,409;
4,236,020;
4,243,798;
4,270,930;
4,274,837;
4,288,612;
4,521,610; and
4,568,358

Of particular relevance is U.S. Pat. No. 4,274,837 which discloses that hydrocarbyl poly(oxyalkylene) aminocarbamates containing certain poly(oxyalkylene) chains, i.e., oxypropylene, when used in fuels employed in combination with certain lubricating oils, produce crankcase varnish. This reference further discloses that lubricating oil compatible hydrocarbyl poly(oxypropylene) aminocarbamates are improved by employing the poly(oxypropylene) as a block copolymer having 1 to 5 $C_9$ to $C_{30}$ oxyalkylene units.

U.S. Pat. No. 4,160,648 discloses an intake system deposit control additive for fuels which is a hydrocarbyl poly(oxyalkylene) aminocarbamate wherein the hydrocarbyl group is from 1 to 30 carbon atoms including alkyl or alkylphenyl groups. Specifically disclosed hydrocarbyl groups include tetrapropenylphenyl, olelyl and a mixture of $C_{16}$, $C_{18}$ and $C_{20}$ alkyl groups. Likewise U.S. Pat. No. 4,288,612 discloses deposit control additives for gasoline engines which are hydrocarbyl poly(oxyalkylene) aminocarbamates wherein the hydrocarbyl group contains from 1 to about 30 carbon atoms including alkylphenyl groups wherein the alkyl group is straight or branched chain of from 1 to about 24 carbon atoms. U.S. Pat. No. 4,568,358 discloses diesel fuel compositions containing an additive such as a hydrocarbyl poly(oxyalkylene) aminocarbamate. This reference discloses hydrocarbyl groups such as alkyl groups of 1 to 30 carbon atoms; aryl groups of 6 to 30 carbon atoms, alkaryl groups of 7 to 30 carbon atoms, etc.

U.S. Pat. No. 4,332,595 discloses hydrocarbyl poly(oxyalkylene) polyamines wherein the hydrocarbyl group is a hydrocarbyl radical of 8 to 18 carbon atoms derived from linear primary alcohols.

U.S. Pat. Nos. 4,233,168 and 4,329,240 among others disclose lubricating oil compositions containing a dispersant amount of a hydrocarbyl poly(oxyalkylene) aminocarbamate.

While these prior art references disclose $C_1$ to $C_{30}$ hydrocarbyl poly(oxyalkylene) aminocarbamates which include the poly(oxypropylene) polymers, none of these references disclose the unique hydrocarbyl group of this invention nor do any of these references suggest that use of this unique hydrocarbyl group would overcome the art recognized problem of lubricating oil incompatibility arising from using the prior art hydrocarbyl poly(oxypropylene) aminocarbamates.

SUMMARY OF THE INVENTION

The instant invention is directed toward a novel class of hydrocarbyl poly(oxypropylene) aminocarbamates which are compatible with lubricating oil compositions. In particular, the instant invention is directed toward an alkylphenyl poly(oxypropylene) aminocarbamate having at least one basic nitrogen and an average molecular weight of about 600 to 6,000 and wherein the alkyl group of said alkylphenyl poly(oxypropylene) aminocarbamate is substantially straight-chain alkyl group of at least 15 carbon atoms. The instant invention is based on the discovery that use of the unique hydrocarbyl group, i.e., an alkylphenyl group wherein the alkyl group is a substantially straight-chain alkyl group of at least 15 carbon atoms, imparts to the alkylphenyl poly(oxypropylene) aminocarbamate lubricating oil compatibility.

The compounds of this invention are useful dispersants in lubricating oil. Thus, in its composition aspect, the instant invention is directed toward a lubricating oil composition comprising an oil of lubricating viscosity and a dispersant effective amount of an alkylphenyl poly(oxypropylene) aminocarbamate of this invention.

DETAILED DESCRIPTION OF THE INVENTION

The alkylphenyl poly(oxypropylene) aminocarbamates of the present invention consist of an amino moiety and an alkylphenyl poly(oxypropylene) polymer bonded through a carbamate linkage, i.e., $-OC(O)N<$. The specific alkylphenyl group employed in the instant invention in the alkylphenyl poly(oxypropylene) polymer is critical to achieving lubricating oil compatibility for the alkylphenyl poly(oxypropylene) aminocarbamates. In particular, it has been found that employing the alkylphenyl group of this invention wherein the alkyl group is substantially straight-chain of at least 15 carbon atoms results in an alkylphenyl poly(oxypropylene) aminocarbamate which is lubricating oil compatible.

The Preferred Alkyphenyl Group

The preferred alkylphenyl group of the alkylphenyl poly(oxypropylene) aminocarbamate employed in this invention is derived from the corresponding alkylphenol of Formula I below:

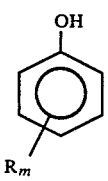

I wherein R is a substantially straight-chain alkyl group of at least 15 carbon atoms and m is an integer from 1 to 2.

Preferably, R is substantially straight-chain alkyl group of from 20 to 50 carbon atoms. More preferably, R is a substantially straight-chain alkyl group of from 20 to 28 carbon atoms.

When m is one, the alkylphenyl is a monoalkylphenyl; whereas when m is two, the alkylphenyl is a dialkylphenyl.

The alkylphenols of Formula I above are prepared by reacting the appropriate olefin or olefin mixture with phenol in the presence of an alkylating catalyst at a temperature of from about 60° C. to 200° C., and preferably 125° C. to 180° C. either neat or in an essentially inert solvent at atmospheric pressure. A preferred alkylating catalyst is a sulfonic acid catalyst such as Amberlyst 15 ® available from Rohm and Haas, Philadelphia, Pa. Molar ratios of reactants can be employed. When molar ratios are employed, the reaction yields a mixture of dialkylphenol, monoalkylphenol and unreacted phenol. As noted above, dialkylphenol and monoalkylphenol can be used to prepare the additives used in the compositions of this invention whereas the unreacted phenol is preferably removed from the post reaction mixture via conventional techniques. Alternatively, molar excess of phenol can be employed, i.e., 2 to 2.5 equivalents of phenol for each equivalent of olefin with unreacted pheno recycled. The latter process maximizes monoalkylphenol. Examples of inert solvents include benzene, toluene, chlorobenzene and 250 thinner which is a mixture of aromatics, paraffins and naphthenes.

Particularly preferred monoalkylphenols employed in this invention are either ortho-monoalkylphenols of Formula II below:

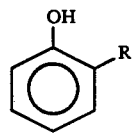

II or para-monoalkylphenols of Formula III below:

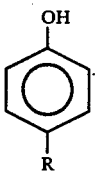

III

Particularly preferred dialkylphenols employed in this invention are generally 2,4-dialkylphenols of Formula IV below:

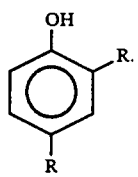

IV although there may be minor amounts of 2,6-dialkylphenol of Formula V below:

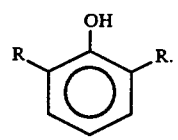

V

While both the ortho- and para-monoalkylphenol are equally preferred in the instant invention, if desired, the para content of the alkylphenol can be enhanced by employing a substantially straight-chain olefin fractions containing some branching in the molecular structure at the double bond such as structures VI and VII

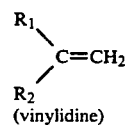

VI (vinylidine)

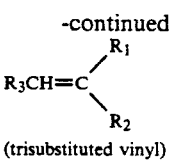

(trisubstituted vinyl)

wherein $R_1$, $R_2$ and $R_3$ form the remainder of the olefin. While being substantially straight-chain, the branched portion of the molecular structure allows for formation of a tertiary carbonium ion during the alkylation process. Without being limited to any theory, it is believed that the steric hindrance associated with a tertiary carbonium ion inhibits ortho alkylation and thereby results in enhanced para substitution.

Suitable substantially straight-chain olefins are those wherein about 75 to 100 number percent and preferably about 85 to 100 number percent of the individual carbon atoms of the olefin are either primary ($CH_3$—) or secondary (—$CH_2$—). Included in the terms primary or secondary are alpha olefins (—CH=$CH_2$) and internal olefins (—CH=CH—). In the converse, such substantially straight-chain olefins can contain from 0 to about 25 number percent although preferably from 0 to about 15 number percent of tertiary carbon atoms. Included within the term tertiary are trisubstituted vinyl groups (>C=CH—) and vinylidine (>C=$CH_2$).

Substantially straight-chain olefin fractions are commercially available products such as $C_{18}$-$C_{30}$ olefins, available from Ethyl Corporation, Baton Rouge, La. These olefins are substantially straight-chain in that from 75 to 100 number percent of the carbon atoms in the olefins are either primary or secondary. On the other hand, about 40 mole percent of the olefins contained in the olefin fraction are branched olefins. That is to say while being otherwise substantially straight-chain 40 mole percent of all of the olefins are branched in the form of trisubstituted vinyl or vinylidine structure. Likewise, $C_{20}$-$C_{24}$ and $C_{24}$-$C_{28}$ olefin fractions, available from Chevron Chemical Company, San Francisco, Calif., are also substantially straight-chain but contain about 40 mole percent or more branched olefin, containing predominantly vinylidine olefin. Straight-chain olefins, containing less than about 5 mole percent branched olefins, are available from Shell Chemical Company, Houston, Tex.

This is the appropriate time to distinguish between "substantially straight-chain olefins containing 75 to 100 number percent of either primary or secondary carbon atoms in the olefin" and a "substantially straight-chain olefin fraction wherein about 40 mole percent of the olefins are branched". In the first case, the olefin is viewed on a molecular basis and requires that at least 75 number percent of the carbon atoms be primary or secondary. In this case, a branched olefin such as trisubstituted vinyl or vinylidine is nonetheless substantially straight-chain if a sufficient number of the remaining carbon atoms are primary or secondary such that at least 75 number percent of the carbon atoms in this olefin are primary or secondary.

On the other hand, a substantially straight-chain olefin fraction wherein about 40 mole percent of the olefins are branched is viewed from a composition basis. That is the substantially straight-chain olefin fraction can contain olefins such as alpha olefins, internal olefins, trisubstituted vinyl and vinylidine. When viewing the entire substantially straight-chain olefin fraction, 40 mole percent of the olefins are branched, i.e., either trisubstituted vinyl or vinylidine, whereas the remainder are either alpha olefins or internal olefins.

Preferred Poly(oxypropylene) Component

The alkylphenyl poly(oxypropylene) polymers which are utilized in preparing the carbamates of the present invention are monohydroxy compounds, i.e., alcohols, often termed alkylphenyl "capped" poly(oxypropylene) glycols and are to be distinguished from the poly(oxypropylene) glycols (diols), which are not alkylphenyl terminated, i.e., not capped. The alkylphenyl poly(oxypropylene) alcohols are produced by the addition of propylene oxide to the alkylphenol of Formula I, i.e.,

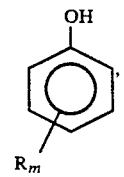

under polymerization conditions, wherein R and m are as defined above. In general, the poly(oxypropylene) polymers will vary in chain length but their properties closely approximate those of the polymer represented by the average composition and molecular weight. Each poly(oxypropylene) polymer contains at least 1 oxypropylene unit, preferably from 1 to about 100 oxypropylene units, more preferably from about 5 to about 50 oxypropylene units, and most preferably from about 10 to about 25 oxypropylene units. Methods of production and properties of these polymers are disclosed in U.S. Pat. Nos. 2,841,479 and 2,782,240, which are incorporated herein by reference, as well as Kirk-Othmer's "Encyclopedia of Chemical Technology", Volume 19, p. 507. An alternative method for preparing alkylphenyl poly(oxypropylene) polymers having either 1, 2, or 3 oxypropylene units involves employing a compound of Formula VIII below

wherein q is an integer from 1 to 3. When employing the compound of Formula VIII, the phenoxide of the alkylphenol, I, is first prepared and then reacted with the compound of Formula VIII to yield the desired alkylphenyl poly(oxypropylene) polymer having from 1 to 3 oxypropylene units. Compounds of Formula VIII are commercially available or can be prepared by art recognized methods.

Preferred Amine Component

The amine moiety of the alkylphenyl poly(oxypropylene) aminocarbamate employed in this invention is preferably derived from a polyamine having from 2 to about 12 amine nitrogen atoms and from 2 to about 40 carbon atoms. The polyamine is preferably reacted with an alkylphenyl poly(oxypropylene) chloroformate to produce the alkylphenyl poly(oxypropylene) aminocarbamate additives finding use within the scope of the present invention. The chloroformate is itself derived from alkylphenyl poly(oxypropylene) alcohol by reaction with phosgene. The polyamine, encompassing diamines, provides the product alkylphenyl poly(oxypropylene) aminocarbamate with, on average, at least about one basic nitrogen atom per carbamate molecule, i.e., a nitrogen atom titratable by a strong acid. The polyamine preferably has a carbon-to-nitrogen ratio of from about 1:1 to about 10:1.

The polyamine may be substituted with substituents selected from (A) hydrogen, (B) hydrocarbyl groups of from 1 to about 10 carbon atoms, (C) acyl groups of from 2 to about 10 carbon atoms, and (D) monoketo, monohydroxy, mononitro, monocyano, lower alkyl and lower alkoxy derivatives of (B) and (C). "Lower", as used in terms like lower alkyl or lower alkoxy, means a group containing from 1 to about 6 carbon atoms. At least one of the substituents on one of the basic nitrogen atoms of the polyamine is hydrogen, e.g., at least one of the basic nitrogen atoms of the polyamine is a primary or secondary amino nitrogen atom.

Hydrocarbyl, as used in describing all the components of this invention, denotes an organic radical composed of carbon and hydrogen which may be aliphatic, alicyclic, aromatic or combinations thereof, e.g., aralkyl. Preferably, the hydrocarbyl group will be relatively free of aliphatic unsaturation, i.e., ethylene and acetylenic, particularly acetylenic unsaturation. The substituted polyamines of the present invention are generally, but not necessarily, N-substituted polyamines. Exemplary hydrocarbyl groups and substituted hydrocarbyl groups include alkyls such as methyl, ethyl, propyl, butyl, isobutyl, pentyl, hexyl, octyl, etc., alkenyls such as propenyl, isobutenyl, hexenyl, octenyl, etc., hydroxyalkyls, such as 2-hydroxyethyl, 3-hydroxypropyl, hydroxyisopropyl, 4-hydroxybutyl, etc., ketoalkyls, such as 2-ketopropyl, 6-ketooctyl, etc., alkoxy and lower alkenoxy alkyls, such as ethoxyethyl, ethoxypropyl, propoxyethyl, propoxypropyl, 2-(2-ethoxyethoxy)ethyl, 2-(2-(2-ethoxyethoxy)ethoxy)ethyl, 3,6,9,12-tetraoxatetradecyl, 2-(2-ethoxyethoxy)hexyl, etc. The acyl groups of the aforementioned (C) substituents are such as propionyl, acetyl, etc. The more preferred substituents are hydrogen, $C_1$-$C_4$ alkyls and $C_1$-$C_4$ hydroxyalkyls.

In a substituted polyamine the substituents are found at any atom capable of receiving them. The substituted atoms, e.g., substituted nitrogen atoms, are generally geometrically inequivalent, and consequently the substituted amines finding use in the present invention can be mixtures of mono- and poly-substituted polyamines with substituent groups situated at equivalent and/or inequivalent atoms.

The more preferred polyamine finding use within the scope of the present invention is a polyalkylene polyamine, including alkylene diamine, and including substituted polyamines, e.g., alkyl and hydroxyalkyl-substituted polyalkylene polyamine. Preferably, the alkylene group contains from 2 to 6 carbon atoms, there being preferably from 2 to 3 carbon atoms between the nitrogen atoms. Such groups are exemplified by ethylene, 1,2-propylene, 2,2-dimethyl-propylene trimethylene, 1,3,2-hydroxypropylene, etc. Examples of such polyamines include ethylene diamine, diethylene triamine, di(trimethylene)triamine, dipropylene triamine, triethylene tetramine, tripropylene tetramine, tetraethylene pentamine, and pentaethylene hexamine. Such amines encompass isomers such as branched-chain polyamines and the previously mentioned substituted polyamines, including hydroxy- and hydrocarbyl-substituted polyamines. Among the polyalkylene polyamines, those containing 2-12 amine nitrogen atoms and 2-24 carbon atoms are especially preferred, and the $C_2$-$C_3$ alkylene polyamines are most preferred, in particular, the lower polyalkylene polyamines, e.g., ethylene diamine, diethylene triamine, propylene diamine, dipropylene triamine, etc.

The amine component of the alkylphenyl poly(oxypropylene) aminocarbamate also may be derived from heterocyclic polyamines, heterocyclic substituted amines and substituted heterocyclic compounds, wherein the heterocycle comprises one or more 5-6 membered rings containing oxygen and/or nitrogen. Such heterocycles may be saturated or unsaturated and substituted with groups selected from the aforementioned (A), (B)(, (C) and (D). The heterocycles are exemplified by piperazines, such as 2-methylpiperazine, N-(2-hydroxyethyl)piperazine, 1,2-bis-(N-piperazinyl)ethane, and N,N'-bis(N-piperazinyl)piperazine, 2-methylimidazoline, 3-aminopiperidine, 2-aminopyridine, 2-(3-aminoethyl)-3-pyrroline, 3-aminopyrrolidine, N-(3-aminopropyl)-morpholine, etc. Among the heterocyclic compounds, the piperazines are preferred.

Another class of suitable polyamines are diaminoethers represented by Formula IX

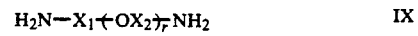

$$H_2N-X_1+OX_2+_rNH_2 \qquad \text{IX}$$

wherein $X_1$ and $X_2$ are independently alkylene from 2 to about 5 carbon atoms and r is an integer from 1 to about 10. Diamines of Formula IX are disclosed in U.S. Pat. No. 4,521,610, which is incorporated herein by reference for its teaching of such diamines.

Typical polyamines that can be used to form the compounds of this invention by reaction with a poly(oxyalkylene)chloroformate include the following: ethylene diamine, 1,2-propylene diamine, 1,3-propylene diamine, diethylene triamine, triethylene tetramine, hexamethylene diamine, tetraethylene pentamine, dimethylaminopropylene diamine, N-(beta-aminoethyl)piperazine, N-(beta-aminoethyl)piperidine, 3-amino-N-ethylpiperidine, N-(beta-aminoethyl)morpholine, N,N'-di(beta-aminoethyl)piperazine, N,N'-di(beta-aminoethylimidazolidone-2; N-(beta-cyanoethyl)ethane-1,2-diamine, 1-amino-3,6,9-triazaoctadecane, 1-amino-3,6-diaza-9-oxadecane, N-(beta-aimonoethyl)diethanolamine, N'-acetyl-N'-methyl-N-(beta-aminoethyl)ethane-1,2-diamine, N-acetonyl-1,2-propanediamine, N-(betanitroethyl)-1,3-propane diamine, 1,3-dimethyl-5-(beta-aminoethyl)hexahydrotriazine, N-(beta-aminoethyl)hexahydrotriazine, 5-(beta-aminoethyl)-1,3,5-dioxazine, 2-(2-aminoethylamino)-ethanol, 2[2-(2-aminoethylamino)ethylamino]-ethanol.

The amine component of the alkylphenyl poly(oxypropylene) aminocarbamate may also be derived from an amine-containing compound which is capable of reacting with an alkylphenyl poly(oxypropylene) alcohol to produce an alkylphenyl poly(oxypropylene) aminocarbamate having at least one basic nitrogen atom. For example, a substituted aminoisocyanate, such as $(R)_2NCH_2CH_2NCO$, wherein R is, for example, a hydrocarbyl group, reacts with the alcohol to produce the aminocarbamate additive finding use within the scope of the present invention. Typical aminoisocyanates that may be used to form the fuel additive compounds of this invention by reaction with a hydrocarbylpoly(oxyalkylene) alcohol include the following: N,N-(dimethyl)aminoisocyanatoethane, generally, N,N-(dihydrocarbyl)aminoisocyanatoalkane, more generally, N-(perhydrocarbyl)isocyanatopolyalkylene polyamine, N,N-(dimethyl)aminoisocyanatobenzene, etc.

In many instances the amine used as a reactant in the production of the carbamate of the present invention is not a single compound but a mixture in which one or several compounds, predominate with the average composition indicated. For example, tetraethylene pentamine prepared by the polymerization of aziridine or the reaction of dichloroethylene and ammonia will have both lower and higher amine members, e.g., triethylene tetramine, substituted piperazines and pentaethylene hexamine, but the composition will be mainly tetraethylene pentamine and the empirical formula of the total amine composition will closely approximate that of tetraethylene pentamine. Finally, in preparing the compounds of this invention, where the various nitrogen atoms of the polyamine are not geometrically equivalent, several substitutional isomers are possible and are encompassed within the final product. Methods of preparation of amines, isocyanates and their reactions are detailed in Sidgewick's "The Organic Chemistry of Nitrogen", Clarendon Press, Oxford, 1966; Nollers' "Chemistry of Organic Compounds", Saunders, Philadelphia, 2nd Ed. 1957; and Kirk-Othmer's "Encyclopedia of Chemical Technology", 2nd Ed., especially Volume 2, pp. 99–16.

Preferred Alkylphenyl Poly(oxypropylene) Aminocarbamate

Having described the preferred alkylphenyl poly(oxypropylene) component and the preferred polyamine component, the preferred alkylphenyl poly(oxypropylene) aminocarbamate additive of the present invention is obtained by linking these components together through a carbamate linkage i.e.,

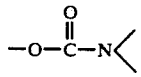

wherein the ether oxygen may be regarded as the terminal hydroxyl oxygen of the alkylphenyl poly(oxypropylene) alcohol component, and the carbonyl group —C(O)— is preferably provided by the coupling agent, e.g., phosgene.

The alkylphenyl poly(oxypropylene) aminocarbamate employed in the present invention has at least one basic nitrogen atom per molecule. A "basic nitrogen atom" is one that is titratable by a strong acid, e.g., a primary, secondary, or tertiary amino nitrogen, as distinguished from, for example, an amido nitrogen, i.e.,

which is not so titratable. Preferably, the basic nitrogen is in a primary or secondary amino group.

The preferred alkylphenyl poly(oxypropylene) aminocarbamate has an average molecular weight of from about 600 to 6,000; preferably an average molecular weight of from 800 to 3,000; and most preferably an average molecular weight of from 1,000 to 2,500.

A preferred class of alkylphenyl poly(oxypropylene) aminocarbamate can be described by the following general formula

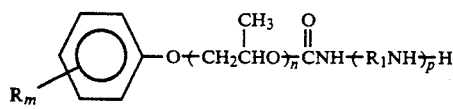

wherein R is a substantially straight-chain alkyl group of at least 15 carbon atoms; $R_1$ is alkylene of 2 to 6 carbon atoms; m is an integer from 1 to 2; n is an integer such that the molecular weight of the compound is from about 600 to 6,000; and p is an integer from 1 to about 6.

Preparation of the Alkylphenyl Poly(oxypropylene) Aminocarbamate

The additives employed in this invention can be most conveniently prepared by first reacting the appropriate alkylphenyl poly(oxypropylene) alcohol with phosgene to produce an alkylphenyl poly(oxypropylene) chloroformate. The chloroformate is then reacted with the polyamine to produce the desired alkylphenyl poly(oxypropylene) aminocarbamate.

Preparation of aminocarbamates are disclosed in U.S. Pat. Nos. 4,160,648; 4,191,537; 4,197,409; 4,236,020; 4,243,798; 4,270,930; 4,274,837; 4,288,612; 4,512,610; and 4,568,358, which are incorporated herein by reference. In general, the reaction of the poly(oxypropylene) compound and phosgene is usually carried out on an essentially equimolar basis, although excess phosgene can be used to improve the degree of reaction. The reaction may be carried out a temperatures from −10° to 100° C., preferably in the range of 0° to 50° C. The reaction will usually be complete within ¼ to 5 hours. Times of reaction will usually be in the range of from 2 to 4 hours.

A solvent may be used in the chloroformylation reaction. Suitable solvents include benzene, toluene, etc.

The reaction of the resultant chloroformate with the amine may be carried out neat or preferably in solution. Temperatures of from −10° to 200° C. may be utilized, the desired product may be obtained by water wash and stripping usually be the aid of vacuum, of any residual solvent.

The mol ratio of polyamine to polyether chloroformate will generally be in the range from about 2 to 20 mols of polyamine per mol of chloroformate, and more usually 5 to 15 mols of polyamine per mole of chloroformate. Since suppression of polysubstitution of the polyamino is usually desired, large molar excesses of the polyamine will be used. Additionally, the preferred adduct is the monocarbamate compound, as opposed to the bis(carbamate) or disubstituted aminoether.

The reaction or reactions may be conducted with or without the presence of a reaction solvent. A reaction solvent is generally employed whenever necessary to reduce the viscosity of the reaction product. These solvents should be stable and inert to the reactants and reaction product. Depending on the temperature of the reaction, the particular chloroformate used, the mol ratios, as well as the reactant concentrations, the reaction time may vary from less than 1 minute to 3 hours.

After the reaction has been carried out for a sufficient length of time, the reaction mixture may be subjected to extraction with a hydrocarbon-water or hydrocarbon-alcohol-water medium to free the product from any low-molecular-weight amine salts which have formed and any unreacted diamine. The product may then be isolated by evaporation of the solvent. Further purification may be effected by column chromatography on silica gel.

Depending on the particular application of the composition of this invention, the reaction may be carried out in the medium in which it will ultimately find use, e.g., polyether carriers or an oleophilic organic solvent or mixtures thereof and be formed at concentrations which provide a concentrate of a detergent composition. Thus, the final mixture may be in a form to be used directly for blending in fuels.

An alternative process for preparing the alkylphenyl poly(oxypropylene) aminocarbamates employed in this invention involves the use of an arylcarbonate intermediate. That is to say, the alkylphenyl poly(oxypropylene) alcohol is reacted with an aryl chloroformate to form an arylcarbonate which is then reacted with the polyamine to form the aminocarbamate employed in this invention. Particularly useful aryl chloroformates include phenyl chloroformate, p-nitrophenyl chloroformate, 2,4-dinitrophenyl chloroformate, p-chlorophenyl chloroformate, 2,4-dichlorophenyl chloroformate, and p-trifluoromethylphenyl chloroformate. Use of the aryl carbonate intermediate allows for conversion to aminocarbamates containing close to the theoretical basic nitrogen while employing less excess of polyamine, i.e., molar ratios of generally from 1:1 to about 5:1 of polyamine to the arylcarbonate, and additionally avoids the generation of hydrogen chloride in the reaction forming the aminocarbamate. Preparation of hydrocarbyl capped poly(oxyalkylene) aminocarbamates via an arylcarbonate intermediate are disclosed in U.S. Ser. Nos. 586,533 and 689,616, which are incorporated herein by reference.

Also included within the scope of this invention are fully formulated lubricating oils containing a dispersant effective amount of an alkylphenyl poly(oxyalkylene) amino carbamate.

Contained in the fully formulated composition is:
1. an alkenyl succinimide,
2. a Group II metal salt of a dihydrocarbyl dithiophosphoric acid,
3. a neutral or overbased alkali or alkaline earth metal hydrocarbyl sulfonate or mixtures thereof, and
4. a neutral or overbased alkali or alkaline earth metal alkylated phenate or mixtures thereof.
5. A viscosity index (VI) improver.

The alkenyl succinimide is present to act as a dispersant and prevent formation of deposits formed during operation of the engine. The alkenyl succinimides are well-known in the art. The alkenyl succinimides are the reaction product of a polyolefin polymer-substituted succinic anhydride with an amine, preferably a polyalkylene polyamine. The polyolefin polymer-substituted succinic anhydrides are obtained by reaction of a polyolefin polymer or a derivative thereof with maleic anhydride. The succinic anhydride thus obtained is reacted with the amine compound. The preparation of the alkenyl succinimides has been described many times in the art. See, for example, U.S. Pat. Nos. 3,390,082; 3,219,666; and 3,172,892, the disclosure of which are incorporated herein by reference. Reduction of the alkenyl substituted succinic anhydride yields the corresponding alkyl derivative. The alkyl succinimides are intended to be included within the scope of the term "alkenyl succinimide". A product comprising predominantly mono- or bis-succinimide can be prepared by controlling the molar ratios of the reactants. Thus, for example, if one mole of amine is reacted with one mole of the alkenyl or alkyl substituted succinic anhydride, a predominantly mono-succinimide product will be prepared. If two moles of the succinic anhydride are reacted per mole of polyamine, a bis-succinimide will be prepared.

Particularly good results are obtained with the lubricating oil compositions of this invention when the alkenyl succinimide is a polyisobutene-substituted succinic anhydride of a polyalkylene polyamine.

The polyisobutene from which the polyisobutene-substituted succinic anhydride is obtained by polymerizing isobutene can vary widely in its compositions. The average number of carbon atoms can range from 30 or less to 250 or more, with a resulting number average molecular weight of about 400 or less to 3,000 or more. Preferably, the average number of carbon atoms per polyisobutene molecule will range from about 50 to about 100 with the polyisobutenes having a number average molecular weight of about 600 to about 1,500. More preferably, the average number of carbon atoms per polyisobutene molecule ranges from about 60 to about 90, and the number average molecular weight ranges from about 800 to 1,300. The polyisobutene is reacted with maleic anhydride according to well-known procedures to yield the polyisobutene-substituted succinic anhydride.

In preparing the alkenyl succinimide, the substituted succinic anhydride is reacted with a polyalkylene polyamine to yield the corresponding succinimide. Each alkylene radical of the polyalkylene polyamine usually has up to about 8 carbon atoms. The number of alkylene radicals can range up to about 8. The alkylene radical is exemplified by ethylene, propylene, butylene, trimethylene, tetramethylene, pentamethylene, hexamethylene, octamethylene, etc. The number of amino groups generally, but not necessarily, is one greater than the number of alkylene radicals present in the amine, i.e., if a polyalkylene polyamine contains 3 alkylene radicals, it will usually contain 4 amino radicals. The number of amino radicals can range up to about 9. Preferably, the alkylene radical contains from about 2 to about 4 carbon atoms and all amine groups are primary or secondary. In this case, the number of amine groups exceeds the number of alkylene groups by 1. Preferably the polyalkylene polyamine contains from 3 to 5 amine groups. Specific examples of the polyalkylene polyamines include ethylenediamine, diethylenetriamine, triethylenetetramine, propylenediamine, tripropylenetetramine, tetraethylenepentamine, trimethylenediamine, pentaethylenehexamine, di-(trimethylene)triamine, tri(hexamethylene)tetramine, etc.

Other amines suitable for preparing the alkenyl succinimide useful in this invention include the cyclic amines such as piperazine, morpholine and dipiperazines.

Preferably the alkenyl succinimides used in the compositions of this invention have the following formula

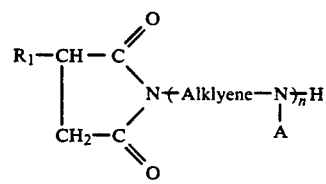

wherein:

(a) $R_1$ represents an alkenyl group, preferably a substantially saturated hydrocarbon prepared by polymerizing aliphatic monoolefins. Preferably $R_1$ is prepared from isobutene and has an average number of carbon atoms and a number average molecular weight as described above;

(b) the "Alkylene" radical represents a substantially hydrocarbyl group containing up to about 8 carbon atoms and preferably containing from about 2–4 carbon atoms as described hereinabove;

(c) A represents a hydrocarbyl group, an amine-substituted hydrocarbyl group, or hydrogen. The hydrocarbyl group and the amine-substituted hydrocarbyl groups are generally the alkyl and amino-substituted alkyl analogs of the alkylene radicals described above. Preferably A represents hydrogen;

(d) n represents an integer of from about 1 to 10, and preferably from about 3–5.

Also included within the term alkenyl succinimide are the modified succinimides which are disclosed in U.S. Pat. No. 4,612,132 which is incoporated herein by reference.

The alkenyl succinimide is present in the lubricating oil compositions of the invention in an amount effective to act as a dispersant and prevent the deposit of contaminants formed in the oil during operation of the engine. The amount of alkenyl succinimide can range from about 1 percent to about 20 percent weight of the total lubricating oil composition. Preferably the amount of alkenyl succinimide present in the lubricating oil composition of the invention ranges from about 1 to about 10 percent by weight of the total composition.

The alkali or alkaline earth metal hydrocarbyl sulfonates may be either petroleum sulfonate, synthetically alkylated aromatic sulfonates, or aliphatic sulfonates such as those derived from polyisobutylene. One of the more important functions of the sulfonates is to act as a detergent and dispersant. These sulfonates are well-known in the art. The hydrocarbyl group must have a sufficient number of carbon atoms to render the sulfonate molecule oil soluble. Preferably, the hydrocarbyl portion has at least 20 carbon atoms and may be aromatic or aliphatic, but is usually alkylaromatic. Most preferred for use are calcium, magnesium or barium sulfonates which are aromatic in character.

Certain sulfonates are typically prepared by sulfonating a petroleum fraction having aromatic groups, usually mono- or dialkylbenzene groups, and then forming the metal salt of the sulfonic acid material. Other feedstocks used for preparing these sulfonates include synthetically alkylated benzenes and aliphatic hydrocarbons prepared by polymerizing a mono- or diolefin, for example, a polyisobutenyl group prepared by polymerizing isobutene. The metallic salts are formed directly or by metathesis using well-known procedures.

The sulfonates may be neutral or overbased having base numbers up to about 400 or more. Carbon dioxide and calcium hydroxide or oxide are the most commonly used material to produce the basic or overbased sulfonates. Mixtures of neutral and overbased sulfonates may be used. The sulfonates are ordinarily used so as to provide from 0.3% to 10% by weight of the total composition. Preferably, the neutral sulfonates are present from 0.4% to 5% by weight of the total composition and the overbased sulfonates are present from 0.3% to 3% by weight of the total composition.

The phenates for use in this invention are those conventional products which are the alkali or alkaline earth metal salts of alkylated phenols. One of the functions of the phenates is to act as a detergent and dispersant. Among other things, it prevents the deposition of contaminants formed during high temperature operation of the engine. The phenols may be mono- or polyalkylated.

The alkyl portion of the alkyl phenate is present to lend oil solubility to the phenate. The alkyl portion can be obtained from naturally occurring or synthetic sources. Naturally occurring sources include petroleum hydrocarbons such as white oil and wax. Being derived from petroleum, the hydrocarbon moiety is a mixture of different hydrocarbyl groups, the specific composition of which depends upon the particular oil stock which was used as a starting material. Suitable synthetic sources include various commercially available alkenes and alkane derivatives which, when reacted with the phenol, yield an alkylphenol. Suitable radicals obtained include butyl, hexyl, octyl, decyl, dodecyl, hexadecyl, eicosyl, tricontyl, and the like. Other suitable synthetic sources of the alkyl radical include olefin polymers such as polypropylene, polybutylene, polyisobutylene and the like.

The alkyl group can be straight-chained or branch-chained, saturated or unsaturated (if unsaturated, preferably containing not more than 2 and generally not more than 1 site of olefinic unsaturation). The alkyl radicals will generally contain from 4 to 30 carbon atoms. Generally when the phenol is monoalkyl-substituted, the alkyl radical should contain at least 8 carbon atoms. The phenate may be sulfurized if desired. It may be either neutral or overbased and if overbased will have a base number of up to 200 to 300 or more. Mixtures of neutral and overbased phenates may be used.

The phenates are ordinarily present in the oil to provide from 0.2% to 27% by weight of the total composition. Preferably, the neutral phenates are present from 0.2% to 9% by weight of the total composition and the overbased phenates are present from 0.2 to 13% by weight of the total composition. Most preferably, the overbased phenates are present from 0.2% to 5% by weight of the total composition. Preferred metals are calcium, magnesium, strontium or barium.

The sulfurized alkaline earth metal alkyl phenates are preferred. These salts are obtained by a variety of processes such as treating the neutralization product of an alkaline earth metal base and an alkylphenol with sulfur. Conveniently the sulfur, in elemental form, is added to the neutralization product and reacted at elevated temperatures to produce the sulfurized alkaline earth metal alkyl phenate.

If more alkaline earth metal base were added during the neutralization reaction than was necessary to neutralize the phenol, a basic sulfurized alkaline earth metal alkyl phenate is obtained. See, for example, the process of Walker et al, U.S. Pat. No. 2,680,096. Additional basicity can be obtained by adding carbon dioxide to the basic sulfurized alkaline earth metal alkyl phenate. The excess alkaline earth metal base can be added subsequent to the sulfurization step but is conveniently added at the same time as the alkaline earth metal base is added to neutralize the phenol.

Carbon dioxide and calcium hydroxide or oxide are the most commonly used material to produce the basic or "overbased" phenates. A process wherein basic sulfurized alkaline earth metal alkylphenates are produced by adding carbon dioxide is shown in Hanneman, U.S. Pat. No. 3,178,368.

The Group II metal salts of dihydrocarbyl dithiophosphoric acids exhibit wear, antioxidant and thermal stability properties. Group II metal salts of phosphorodithioic acids have been described previously. See, for example, U.S. Pat. No. 3,390,080, columns 6 and 7, wherein these compounds and their preparation are described generally. Suitably, the Group II metal salts of the dihydrocarbyl dithiophosphoric acids useful in the lubricating oil composition of this invention contain from about 4 to about 12 carbon atoms in each of the hydrocarbyl radicals and may be the same or different and may be aromatic, alkyl or cycloalkyl. Preferred hydrocarbyl groups are alkyl groups containing from 4 to 8 carbon atoms and are represented by butyl, isobutyl, sec.-butyl, hexyl, isohexyl, octyl, 2-ethylhexyl and the like. The metals suitable for forming these salts include barium, calcium, strontium, zinc and cadmium, of which zinc is preferred.

Preferably, the Group II metal salt of a dihydrocarbyl dithiophosphoric acid has the following formula

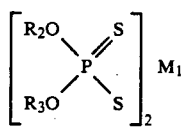

wherein:

(e) $R_2$ and $R_3$ each independently represent hydrocarbyl radicals as described above, and (f) $M_1$ represents a Group II metal cation as described above.

The dithiophosphoric salt is present in the lubricating oil compositions of this invention in an amount effective to inhibit wear and oxidation of the lubricating oil. The amount ranges from about 0.1 to about 4 percent by weight of the total composition, preferably the salt is present in an amount ranging from about 0.2 to about 2.5 percent by weight of the total lubricating oil composition. The final lubricating oil composition will ordinarily contain 0.025 to 0.25% by weight phosphorus and preferably 0.05 to 0.15% by weight.

Viscosity index (VI) improvers are either non-dispersant or dispersant VI improvers. Non-dispersant VI improvers are typically hydrocarbyl polymers including copolymers and terpolymers. Typically hydrocarbyl copolymers are copolymers of ethylene and propylene. Such non-dispersant VI improvers are disclosed in U.S. Pat. Nos. 2,700,633; 2,726,231; 2,792,288; 2,933,480; 3,000,866; 3,063,973; and 3,093,621 which are incorporated herein by reference for their teaching of non-dispersant VI improvers.

Dispersant VI improvers can be prepared by functionalizing non-dispersant VI improvers. For example, non-dispersant hydrocarbyl copolymer and terpolymer VI improvers can be functionalized to produce aminated oxidized VI improvers having dispersant properties and a number average molecular weight of from 1,500 to 20,000. Such functionalized dispersant VI improvers are disclosed in U.S. Pat. Nos. 3,864,268; 3,769,216; 3,326,804 and 3,316,177 which are incorporated herein by reference for their teaching of such dispersant VI improvers.

Other dispersant VI improvers include amine-grafted acrylic polymers and copolymers wherein one monomer contains at least one amino group. Typical compositions are described in British Patent No. 1,488,382; and U.S. Pat. Nos. 4,89,794 and 4,025,452, which are incorporated herein by reference for their teaching of such dispersant VI improvers.

Non-dispersant and dispersant VI improvers are generally employed at from 5 to 20 percent by weight in the lubricating oil composition.

Lubricating Oil Compositions

The alkylphenyl poly(oxypropylene) aminocarbamates of this invention are useful as dispersant additives when employed in lubricating oils. When employed in this manner, the additive is usually present in from 0.2 to 10 percent by weight to the total composition, preferably at about 0.5 to 8 percent by weight and more preferably at about 1 to 6 percent by weight. The lubricating oil used with the additive compositions of this invention may be mineral oil or synthetic oils of lubricating viscosity and preferably suitable for use in the crankcase of an internal combustion engine. Crankcase lubricating oils ordinarily have a viscosity of about 1300 CSt 0° F. to 22.7 CSt at 210° F. (99° C.). The lubricating oils may be derived from synthetic or natural sources. Mineral oil for use as the base oil in this invention includes paraffinic, naphthenic and other oils that are ordinarily used in lubricating oil compositions. Synthetic oils include both hydrocarbon synthetic oils and synthetic esters. Useful synthetic hydrocarbon oils include liquid polymers of alpha olefins having the proper viscosity. Especially useful are the hydrogenated liquid oligomers of $C_6$ to $C_{12}$ alpha olefins such as 1-decene trimer. Likewise, alkyl benzenes of proper viscosity such as didodecyl benzene, can be used. Useful synthetic esters include the esters of both monocarboxylic acid and polycarboxylic acids as well as monohydroxy alkanols and polyols. Typical examples are didodecyl adipate, pentaerythritol tetracaproate, di-2-ethylhexyl adipate, dilaurylsebacate and the like. Complex esters prepared from mixtures of mono and dicarboxylic acid and mono and dihydroxy alkanols can also be used.

Blends of hydrocarbon oils with synthetic oils are also useful. For example, blends of 10 to 25 weight percent hydrogenated 1-decene trimer with 75 to 90 weight percent 150 SUS (100° F.) mineral oil gives an excellent lubricating oil base.

Additive concentrates are also included within the scope of this invention. The concentrates of this invention usually include from about 90 to 50 weight percent of an oil of lubricating viscosity and from about 10 to 50 weight percent of the additive of this invention. Typically, the concentrates contain sufficient diluent to make them easy to handle during shipping and storage. Suitable diluents for the concentrates include any inert diluent, preferably an oil of lubricating viscosity, so that the concentrate may be readily mixed with lubricating oils to prepare lubricating oil compositions. Suitable lubricating oils which can be used as diluents typically have viscosities in the range from about 35 to about 500 Saybolt Universal Seconds (SUS) at 100° F. (38° C.), although an oil of lubricating viscosity may be used.

Other additives which may be present in the formulation include rust inhibitors, foam inhibitors, corrosion inhibitors, metal deactivators, pour point depressants, antioxidants, and a variety of other wellknown additives.

EXAMPLES

Example 1

Preparation of a $C_{20}$–$C_{24}$ Alkylphenol

To a 5-liter flask, equipped with stirrer, Dean Stark trap, condensor, and nitrogen inlet and outlet was added 50 gm of a substantially straight chain $C_{20}$ to $C_{24}$ olefin mixture (approximate olefin content $C_{18}$ and less-1%; $C_{20}$-49%; $C_{22}$-42%; $C_{24}$-8%; $C_{26}$ and greater-0.1%) wherein in the entire olefin fraction at least 15 mole percent of said olefins contain vinylidine groups ($C_{20}$ to $C_{24}$ olefins are available from Chevron Chemical Company, San Francisco, Calif.) 656 grams of phenol, 75 grams of a sulfonic acid cation exchange resin (polystyrene crosslinked with divinylbenzene) catalyst (Amberlyst 15 ® available from Rohm and Haas, Philadelphia, Pa.). The reaction mixture was stripped by heating under vacuum and the product was filtered hot over diatomaceous earth to afford 1050 grams of a $C_{20}$ to $C_{24}$ alkylphenol with a hydroxyl number of 120 and with approximate 45% para-alkylphenol content.

Example 2

Preparation of a $C_{20}$–$C_{28}$ Alkylphenol

To a 2-liter flask, equipped with stirrer, Dean Stark trap, condensor and nitrogen inlet and outlet was added 674 gms of a substantially straight chain $C_{20}$ to $C_{28}$ olefin mixture (olefin content: $C_{18}$-2%; $C_{20}$-28%; $C_{22}$-19%; $C_{24}$-13%; $C_{26}$-21%; $C_{28}$-11%; and greater than $C_{30}$-6%) herein in the entire olefin fraction at least 20 mole percent of said olefins contain vinylidine groups ($C_{20}$–$C_{24}$ olefins and $C_{24}$–$C_{28}$ olefins are available from Chevron Chemical Company, San Francisco, Calif. and are then physically mixed at an equal mole basis to provide a $C_{20}$–$C_{28}$ olefin mixture), 211.5 grams of phenol, 43 grams of a sulfonic acid cation exchange resin (polystyrene crosslinked with divinylbenzene) catalyst (Amberlyst 15 ® available from Rohm and Haas, Philadelphia, Pa.). The reaction mixture was heated to about 140° C. for about 8 hours with stirring under a nitrogen atmosphere. The reaction mixture was stripped by heating under vacuum and the product was filtered hot over diatomaceous earth to afford 574 grams of a $C_{20}$–$C_{28}$ alkylphenol with a hydroxyl number of 110 and with 56% para-alkylphenol content.

Example 3

Preparation of Tetrapropenylphenol

To a 2-liter flask, equipped with stirrer, Dean Stark trap, condensor, and nitrogen inlet and outlet was added 567 grams of tetrapropylene, 540 grams of phenol, 72 grams of a sulfonic acid cation exchange resin (polystyrene crosslinked with divinylbenzene) catalyst (Amberlyst 15 ® available from Rohm and Haas, Philadelphia, Pa.). The reaction mixture was heated to about 110° C. for about 3 hours with stirring under a nitrogen atmosphere. The reaction mixture was stripped by heating under vacuum and the resulting product filtered hot over diatomaceous earth to afford 626 grams of tetrapropenylphenol and with a hydroxyl number of 205 and with 96% para-alkylphenol content.

Example 4

Preparation of $C_{20}$ to $C_{28}$ Alkylphenol Poly(oxypropylene) Alcohol

To a dried 12-liter 3-necked flask under a nitrogen atmosphere was added 3.5 liter of toluene and 2020.5 grams (4.61 moles) of a $C_{20}$ to $C_{28}$ alkylphenol prepared in a manner similar to Example 2. The system was warmed to approximately 60° C. and 60 grams (1.54 moles) of metallic potassium cut into small pieces was slowly added with vigorous stirring. The temperature of the reaction system was allowed to increase during this addition and reached approximately 100° C. After 2½ hours, all of the metallic potassium was dissolved. The reaction system was then allowed to cool to 60° C. Afterwards, 4552 grams (78.37 moles) of propylene oxide was added to the system by an addition funnel at an addition rate slow enough to avoid flooding of the vapor condensing system, i.e., Dean Stark trap. The system was then gently refluxed for 72 hours at which point the temperature increased to 110° C. and was held there for an additional 3 hours. The system was then cooled to 60° C. and the reaction quenched by the addition of 0.54 liter of 3N HCl solution. The system was then dried by azeotropic distillation. The system was then diluted with 10 liters of hexane which was afterwards extracted three times with a slightly basic brine solution (pH=8 to 9). In each extraction, a cuff between the aqueous solution and the hexane solution was formed. The cuff as well as the aqueous solution was discarded after each extraction. The resulting hexane solution was stripped and dried under elevated temperature and high vacuum to afford 4450 grams of the title compound as a light weight oil having a molecular weight of approximately 1435 and a hydroxyl number of 39.

Example 5

Preparation of $C_{20}$ to $C_{28}$ Alkylphenyl Poly(oxypropylene) Chloroformate To a 12-liter 3-necked flask under a nitrogen atmosphere was added 3 liters of anhydrous toluene and 3042 grams (2.6 moles) of $C_{20}$ to $C_{28}$ alkylphenyl poly(oxypropylene) alcohol prepared as in Example 4 above. The system was cooled to 5° C. with stirring. While stirring, 297 grams (3.0 moles) of liquid phosgene was added all at once to the reaction system. The reaction system was allowed to warm to room temperature and stirred gently for 24 hours. In order to remove excess phosgene as well as HCl formed during the reaction, the system was vigorously sparged with nitrogen. Infrared analysis of an aliquot revealed a strong chloroformate absorption at 1785 $cm^{-1}$ and no detectable alcohol absorption at 3450 $cm^{-1}$.

Example 6

Preparation of $C_{20}$ to $C_{28}$ Alkylphenyl Poly(oxypropylene) Ethylene Diamine Carbamate The entire chloroformate/toluene solution of Example 5 was diluted with 4 liters of dry toluene. In a separate flask, 2565 grams (42.7 moles) was also diluted with 4 liters of dry toluene. At room temperature, these two solution were rapidly mixed using two variable speed teflon gear pumps and a 10 inch Kenics static mixer. After fifteen minutes, the crude reaction mixture was stripped, diluted with 12 liters of hexane, and washed successively once with water and three times with a slightly basic (pH≃9) brine solution. Phase separation of the aqueous brine solution and the hexane solution was improved by adding brine as needed. The hexane solution was separated, dried over anhydrous sodium sulfate, filtered and stripped to afford the title product as a light yellow liquid which solidified to a loose paste upon cooling and having an alkalinity value of 30 and 0.75 weight percent basic nitrogen.

Example 7

Preparation of $C_{20}$ to $C_{28}$ Alkylphenyl Poly(oxypropylene) Diethylene Triamine Carbamate In the manner described in Example 6 above, 2256 grams (1.53 moles) of $C_{20}$ to $C_{28}$ alkylphenyl poly(oxypropylene) chloroformate prepared similarly to method described in Example 5 above was treated with 2654 grams (25.8 moles) of diethylene triamine to afford the title compound having an alkalinity value of 56 and 1.4 weight percent basic nitrogen.

Example 8

Preparation of n-Butyl Poly(oxypropylene) Ethylene Diamine Carbamate 2000 grams (0.91 moles) of n-butyl poly(oxypropylene) alcohol was prepared in the manner of Example 4 by substituting n-butanol for the $C_{20}$ to $C_{28}$ alkylphenol. The n-butyl poly(oxypropylene) alcohol was then treated with phosgene in the manner of Example 5 to yield the n-butyl poly(oxypropylene) chloroformate which was reacted with 1093 grams (18.2 moles) of ethylene diamine in the manner of Example 6 to yield the title compound as a light yellow liquid having an alkalinity value of 22.5 and 0.56 weight percent basic nitrogen.

Other hydrocarbyl poly(oxyalkylene) alcohols were prepared by employing different hydrocarbyl groups including those of Examples 2 and 3; by employing different poly(oxyalkylene) group of different chain lengths. Examples 9 through 17 found below in Table I summarizes the different hydrocarbyl poly(oxyalkylene) alcohols so prepared.

TABLE I

COMPOUNDS OF THE FORMULA $$R_3-O+CH_2CHO\mathbin{\!+\!}_n H$$
$$\phantom{R_3-O+CH_2C}|\phantom{HO+_n H}$$
$$\phantom{R_3-O+CH_2CHO+_n H}R_1$$

| Example | $R_3$ | $R_1$ | n |
|---|---|---|---|
| 9  | n-butyl | $-CH_3$ | ~37 |
| 10 | n-butyl | $-CH_3$ | ~23 |
| 11 | tetrapropenylphenyl | $-CH_3$ | ~20 |
| 12 | tetrapropenylphenyl | $-CH_2CH_3$ | ~17 |
| 13 | $C_{20}$ to $C_{28}$ alkylphenyl | $-CH_3$ | ~17 |
| 14 | $C_{20}$ to $C_{28}$ alkylphenyl | $-CH_3$ | ~14 |
| 15 | $C_{20}$ to $C_{28}$ alkylphenyl | $-CH_3$ | ~10 |
| 16 | $C_{20}$ to $C_{28}$ alkylphenyl | $-CH_3$ | ~6 |
| 17 | $C_{20}$ to $C_{28}$ alkylphenyl | $-CH_2CH_3$ | ~17 |

Other hydrocarbyl poly(oxyalkylene) aminocarbamates were prepared by employing different hydrocarbyl groups including those of Examples 2 and 3 and by employing poly(oxyalkylene) groups of different chain lengths. Examples 18 through 28 found below in Table II summarizes the different hydrocarbyl poly(oxyalkylene) aminocarbamates so prepared.

TABLE II

COMPOUNDS OF THE FORMULA $$R_3O+CH_2CHO\mathbin{\!+\!}_n\overset{R_1}{\underset{}{\mathrm{C}}}NH+R_2-NH\mathbin{\!+\!}_p H$$

with $R_1$ on the carbon bearing the $\overset{O}{\|}C$ group.

| Example | $R_3$ | $R_1$ | $R_2$ | n | p |
|---|---|---|---|---|---|
| 18 | n-butyl | $-CH_3$ | $-CH_2CH_2-$ | ~37 | 1 |
| 19 | n-butyl | $-CH_3$ | $-CH_2CH_2-$ | ~23 | 1 |
| 20 | tetrapropenylphenyl | $-CH_3$ | $-CH_2CH_2-$ | ~20 | 1 |
| 21 | tetrapropenylphenyl | $-C_2H_5$ | $-CH_2CH_2-$ | ~17 | 1 |
| 22 | tetrapropenylphenyl | $-C_2H_5$ | $-CH_2CH_2-$ | ~17 | 2 |
| 23 | $C_{20}$ to $C_{28}$ alkylphenyl | $-CH_3$ | $-CH_2CH_2-$ | ~17 | 1 |
| 24 | $C_{20}$ to $C_{28}$ alkylphenyl | $-CH_3$ | $-CH_2CH_2-$ | ~14 | 1 |
| 25 | $C_{20}$ to $C_{28}$ alkylphenyl | $-CH_3$ | $-CH_2CH_2-$ | ~10 | 1 |
| 26 | $C_{20}$ to $C_{28}$ alkylphenyl | $-CH_3$ | $-CH_2CH_2-$ | ~6 | 1 |
| 27 | $C_{20}$ to $C_{28}$ alkylphenyl | $-CH_3$ | $-CH_2CH_2-$ | ~17 | 2 |
| 28 | $C_{20}$ to $C_{28}$ alkylphenyl | $-CH_2H_5$ | $-CH_2CH_2-$ | ~17 | 1 |

Example 29

Oil Solubility Bench Test

This procedure was designed to determine the oil solubility/compatibility of different additives in a fully formulated lubricating oil. Insofar as much as 25–30% of a gasoline additive can enter into the crankcase via blow-by and/or cylinder wall/piston ring "wipe down", this is an important performance criteria.

The lubricating oil composition was formulated to contain: 6 percent by weight of a mono-polyisobutenyl succinimide; 20 millimoles per kilogram of a highly overbased sulfurized calcium phenate; 30 millimoles per kilogram of a highly overbased sulfurized calcium hydrocarbyl sulfonate; 22.5 millimoles per kilogram of a zinc dithiophosphate; 13 weight percent of a commercial nondispersant viscosity index improver; 5 parts per million of a foam inhibitor in 150N Exxon base oil to give a 10 W 40 formulated oil.

The oil solubility of the additive was determined as follows:

To a heated solution (50 grams) of the above-described lube oil was added 50 grams of the neat additive. The mixture was then heated with constant stirring to 170° F. and maintained at that temperature for 15 minutes. Dilutions were then prepared according to the desired solubility test range using fresh hot reference oil as the diluent. In each case, the diluted samples were stirred to 170° F. for 10 minutes to insure complete mixing. The solutions were then sealed and left to cool undisturbed for from 1–5 days typically at room temperature. Each sample was then rate visually for oil continuity.

Additives that were marginally soluble in this blend separate as a denser secondary phase, and were clearly visible as such without the need for centrifugation. Additives which gave rise to oil compatibility problems were inherently oil soluble, however, they tended to displace what appears to be the VI improver. This phenomenon resulted in the separation of the VI improver which is less dense than the bulk oil forming a clear thick upper layer. The solubility/compatibility of a gasoline additive was thereby defined as the highest concentration (on a weight basis) which did not result in the formation of either an insoluble lower additive phase or an insoluble upper VI improver phase.

The oil solubility (or insolubility) of the hydrocarbyl poly(oxyalkylene) aminocarbamates including the alkylphenyl poly(oxypropylene) aminocarbamates of this invention is believed to correlate well to the oil solubility of the precursor hydrocarbyl poly(oxyalkylene) alcohol. Accordingly, Table III below contains solubility data for both the hydrocarbyl poly(oxyalkylene) alcohol and the hydrocarbyl poly(oxyalkylene) aminocarbamate derived therefrom. Oil solubility is reported weight percent of additive in the lubricating oil composition.

TABLE III

| Example No. | Oil Solubility | Example No. | Oil Solubility |
| --- | --- | --- | --- |
| 9 | 5 | 18 | 0.5 |
| 10 | 8 | 19 | 1 |
| 11 | 18 | 20 | 7 |
| 12 | 27 | 21 | 15 |
| 13 | 40 | 22 | 15 |
| 14 | 50 | 23 | 16 |
| 15 | 50 | 24 | 20 |
| 16 | 50 | 25 | 45 |
| 17 | 50 | 26 | 50 |
|  |  | 27 | 16 |
|  |  | 28 | 16 |

Examples 9-12, 17, 18-22 and 28 represent prior art compositions. This Table establishes that the additives of this invention possess lubricating oil compatibility. This is particularly surprising in view of the fact that prior art hydrocarbyl poly(oxypropylene) aminocarbamates are not lubricating oil compatible, i.e., Examples 18, 19 and 20.

Example 30

A formulated oil containing an alkylphenyl poly(oxypropylene) aminocarbamate of this invention was tested in a Sequence V-D test method as well as formulated oils containing comparative hydrocarbyl poly(oxyalkylene) aminocarbamates. This procedure utilizes a Ford 2.3-liter, four-cylinder Pinto engine. The test method simulates a type of severe field test service characterized by a combination of low speed, low temperature "stop and go" city driving and moderate turnpike operation. The effectiveness of the additives in the oil is measured in terms of the protection against sludge and varnish deposits on a 0 to 10 scale with 0 being black and 10 indicating no varnish or sludge deposits. The results of these tests are found in Table IV below.

The reference composition was formulated to contain: 6 percent by weight of a mono-polyisobutenyl succinimide; 20 millimoles per kilogram of a highly overbased sulfurized calcium phenate; 30 millimoles per kilogram of a highly overbased calcium hydrocarbyl sulfonate; 22.5 millimoles per kilogram of a zinc dithiophosphate; 13 weight percent of a commercial nondispersant viscosity index improver; 5 parts per million of a foam inhibitor in 150N Exxon base oil to give a 10 W 40 formulated oil.

Comparisons against this reference were made by employing an oil formulated identically as reference except for the additional amount of the additive as shown in Table IV below:

TABLE IV

| Amount of Additive Added to Reference Oil | Sequence V-D Engine Test Results | | |
| --- | --- | --- | --- |
|  | DEPOSITS | | |
|  | AS[1] | AV[2] | PV[3] |
| —(Reference)[4] | 9.6 | 6.3 | 7.1 |
| 5.5% of Example 18[5] | 9.2[6] | 4.4[6] | 6.6[6] |
| 2.5% of Example 21[5] | 9.5 | 5.7 | 7.0 |
| 5.5% of Example 21[7] | 9.5-9.6 | 5.5 | 7.1 |
| 2.5% of Example 24[7] | 9.6 | 6.4 | 6.7 |
| 5.5% of Example 24[7] | 9.3-9.4 | 7.5 | 7.3 |

[1] average sludge
[2] average varnish
[3] piston varnish
[4] average of six runs
[5] one run
[6] oil rings and lash adjustors stick
[7] average of two runs Examples 18 and 21 represent prior art hydrocarbyl poly(oxyalkylene) aminocarbamates whereas Example 24 is an alkylphenyl poly(oxypropylene) aminocarbamate of this invention. This Table establishes that the alkylphenyl poly(oxypropylene) aminocarbamates of this invention gave decreased crankcase deposits as measured by average varnish in the Sequence V-D results compared to the prior art additives.

What is claimed is:

1. An alkylphenyl poly(oxypropylene) aminocarbamate having at least one basic nitrogen and an average molecular weight of about 1,000 to 2,500, wherein the alkyl group of said alkylphenyl poly(oxypropylene) aminocarbamate is derived from a substantially straight-chain $C_{20}$ to $C_{28}$ olefin mixture and wherein the aminocarbamate group of said alkylphenyl poly(oxypropylene) aminocarbamate is derived from a polyalkylene polyamine selected from the group consisting of ethylene diamine, propylene diamine, diethylene triamine and dipropylene triamine.

2. The alkylphenyl poly(oxypropylene) aminocarbamate according to claim 1, wherein the allkyl group of said alkylphenyl poly(oxypropylene) aminocarbamate is derived from a substantially straight-chain $C_{20}$ to $C_{24}$ olefin mixture.

3. The alkylphenyl poly(oxypropylene) aminocarbamate according to claim 1, wherein said alkylphenyl poly(oxypropylene) aminocarbamate contains from about 10 to 25 oxypropylene units.

4. The alkylphenyl poly(oxypropylene) aminocarbamate according to claim 11, wherein the aminocarbamate group is derived from ethylene diamine.

5. An alkylphenyl poly(oxypropylene) aminocarbamate of the formula:

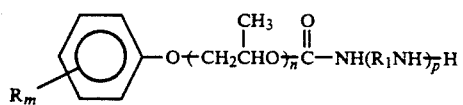

wherein R is an alkyl group derived from a substantially straight-chain $C_{20}$ to $C_{28}$ olefin mixture; $R_1$ is alkylene of from 2 to 3 carbon atoms; m is an integer from 1 to 2; n is an integer such that the molecular weight of the alkylphenyl poly(oxypropylene) aminocarbamate is from about 1,000 to 2,500; and p is an integer from 1 to 2.

6. The alkylphenyl poly(oxypropylene) aminocarbamate according to claim 5, wherein R is an alkyl group derived from a substantially straight-chain $C_{20}$ to $C_{24}$ olefin mixture.

7. The alkylphenyl poly(oxypropylene) aminocarbamate according to claim 5, wherein n is an integer from 10 to 25.

8. The alkylphenyl poly(oxypropylene) aminocarbamate according to claim 5, wherein $R_1$ is alkylene of 2 carbon atoms and p is 1.